United States Patent [19]
Komarek et al.

[11] Patent Number: 5,768,428
[45] Date of Patent: Jun. 16, 1998

[54] METHOD AND CIRCUIT FOR READING CODE WORDS HAVING VARIABLE LENGTHS OUT OF A MEMORY USED FOR CODE WORDS HAVING FIXED LENGTHS OF WORDS

[75] Inventors: Thomas Komarek, Herzogenrath; Christian Krönke, Langenhagen; Manfred Oberwestberg, Hanover, all of Germany

[73] Assignee: SICAN Gesellschaft für Silizium-Anwendungen und CAD/CAT Niedersachsen mbH, Hanover, Germany

[21] Appl. No.: 561,289

[22] Filed: Nov. 21, 1995

[30] Foreign Application Priority Data

Nov. 21, 1994 [DE] Germany .............. 44 41 293.2

[51] Int. Cl.$^6$ ...................................... G06K 9/36
[52] U.S. Cl. ........................................... 382/232
[58] Field of Search .................. 382/232, 233, 382/234, 236, 248, 250, 253; 358/426, 427, 433; 348/384, 416

[56] References Cited

U.S. PATENT DOCUMENTS

| | | | |
|---|---|---|---|
| 5,245,338 | 9/1993 | Sun | 341/67 |
| 5,253,053 | 10/1993 | Chu | 382/232 |
| 5,295,203 | 3/1994 | Krause et al. | 382/248 |
| 5,479,527 | 12/1995 | Chen | 382/232 |
| 5,566,254 | 10/1996 | Murata et al. | 382/233 |
| 5,598,483 | 1/1997 | Purcell et al. | 382/232 |

*Primary Examiner*—Jose L. Couso
*Attorney, Agent, or Firm*—Flehr Hohbach Test Albritton & Herbert LLP

[57] ABSTRACT

A circuit and method for reading code words having variable lengths out of a memory used for data words having a fixed length. In the circuit and method, two shifting operations are separated from each other in dimension and time. The first shifting operation is performed using a combination of multiplexers and buffers that does not include a barrel shifter. The circuit and method are especially suitable for use in the decompression of data when transmitting multimedia information, such as information based on H.261, JPEG and MPEG standards.

9 Claims, 2 Drawing Sheets

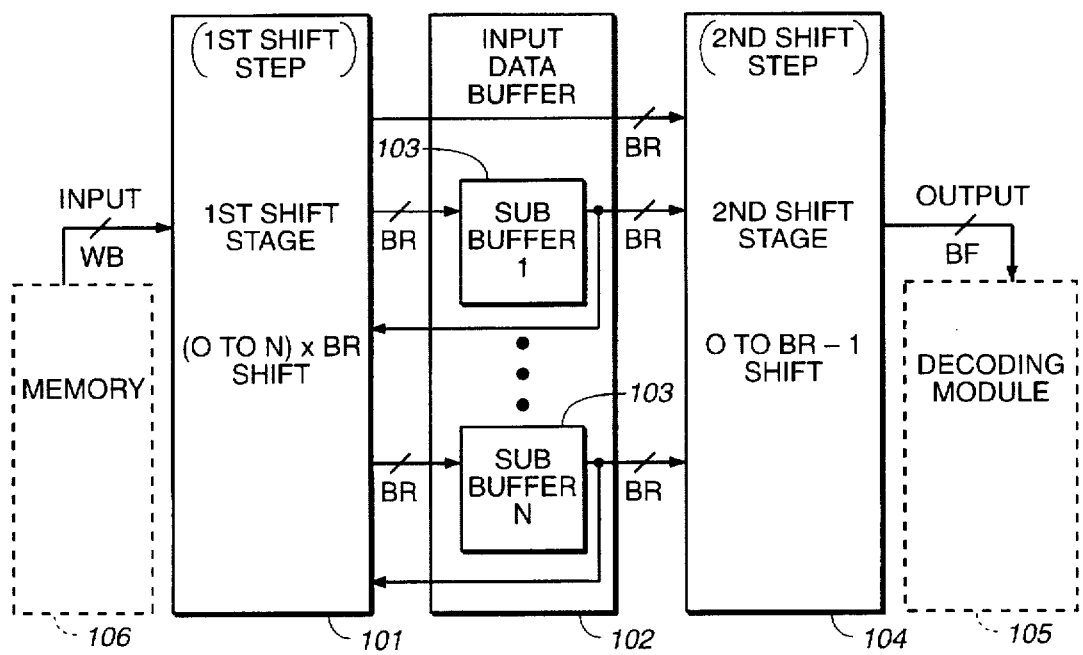
FIG._1
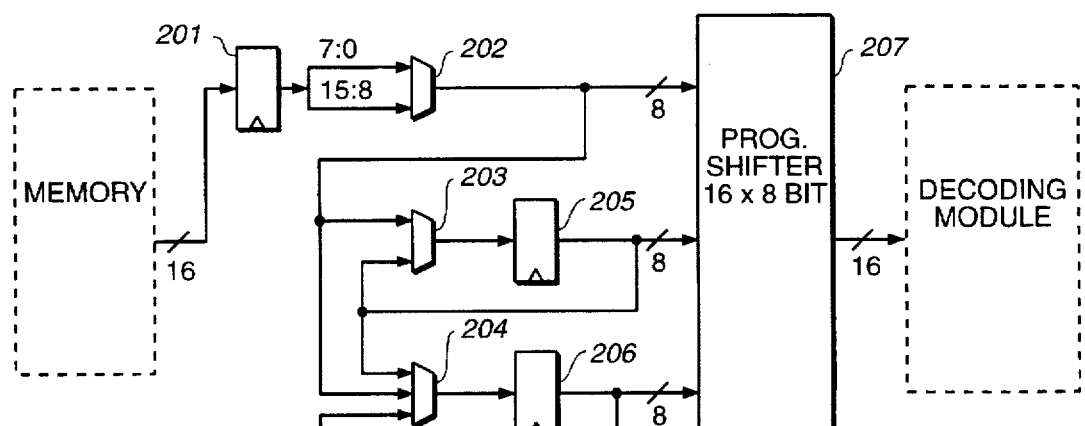
FIG._2

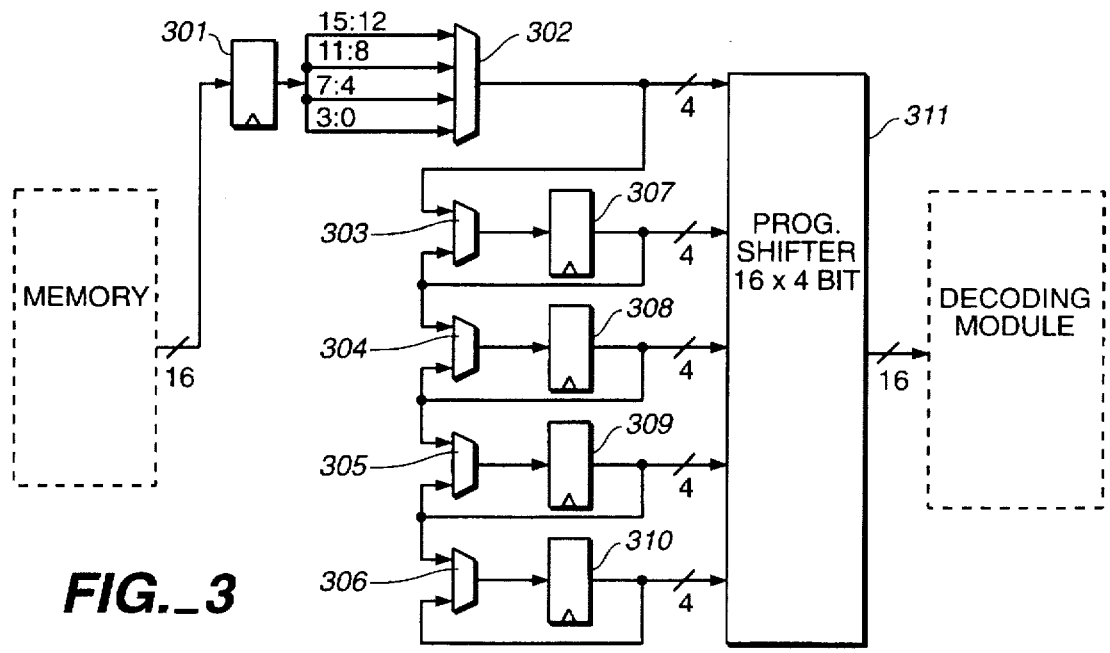
FIG._3
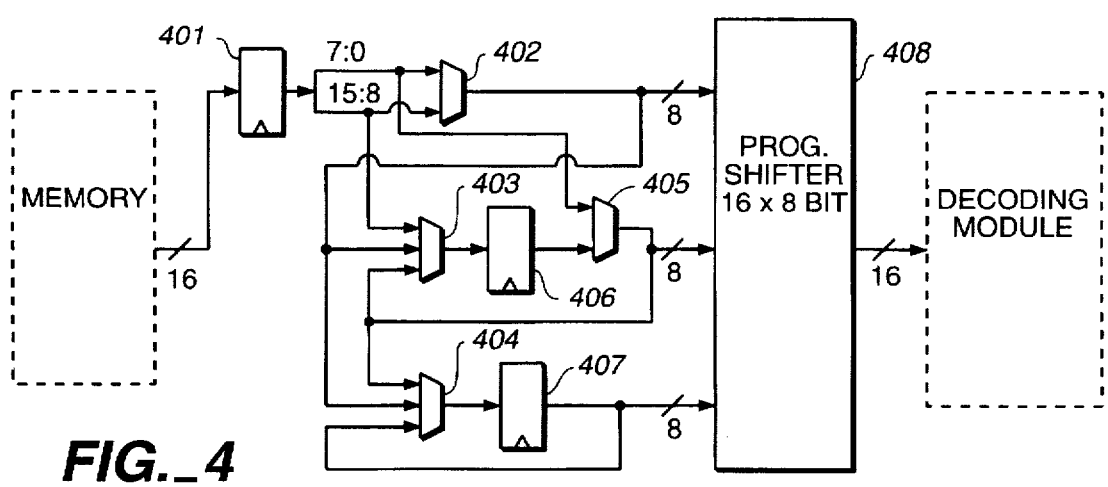
FIG._4

METHOD AND CIRCUIT FOR READING CODE WORDS HAVING VARIABLE LENGTHS OUT OF A MEMORY USED FOR CODE WORDS HAVING FIXED LENGTHS OF WORDS

The invention relates to a method and a circuit for reading code words having variable lengths out of a memory used for code words having fixed lengths of words.

Code words having variable lengths especially occurring while applicating method for compression of data. Increasingly these methods are used in data transmission for reducing the data to be transmitted and using the channels bandwidth in an effective and cheap manner. Especially for transmitting multimedia information, above all based on the standards H.261, JPEG and MPEG, methods for compressing data are applied.

There are different methods known for compressing data. Very often Hufmann-coding is used as a method of coding. It is based on code words having variable lengths. In this method short code words are assigned to symbols having a high probability of occurring, while symbols having lower probability of occurring are assigned to long code words. This methods leads to a reduce of the average lengths of code words.

The problem of this method and of similar methods is decoding the code words. The limits of the code words are variable in-between a data stream and the length of a code word is known only after decoding. Therefore variable separating the corresponding bits out of the data stream is required, until the limit of the next code word is reached.

STATE OF THE ART

In known methods an input data buffer having a barrel-shifter downstream used for the required shift operations is used as a rule.

In the patent U.S. Pat. No. 05,253,053 ("Variable Length Decoding using Lookup Tables", October 1993) a corresponding method for variable length decoding is disclosed. Two data buffer, a barrel shifter and two decoding tables are used for the transformation of the variable data format into a fixed format. Using a barrel shifter the signal flow is delayed, so that disadvantageously an additional data buffer is required at the output of the shifter. There is an unfavourable timing of the disclosed method and the expenditure for the circuit is relatively high.

OBJECT OF THE INVENTION

The object of the invention is reading code words having variable length out of a memory used for code words having fixed length, said method being independent of the code words length and usable even if sequences of code words having fixed length are occurring. The operation of reading should be flexible adapted to the length, so that the need for implementations, the need for calculation and the required time for calculation is low.

In general three factors can be achieved having influence to the method. The first factor is the width of words (WB) of the data memory. The second factor is the number of clocks being disposable until the following code word has to be decoded. The third factor is the width of the bit window (BF) for decoding. Decoding in parallel the width of the bit window (BF) meets the maximum length of one code word as a rule.

INVENTION

In order to achieve the above object, there is provided a method as claimed in claim 1 and a circuit as claimed in claim 2.

Using the invention the expenditure of hardware is decreased because of the flexible architecture and the optimised adapted bit width in respect to the width of words and the bit window. Moreover the hardware can be reduced using the tracings of the process while decoding. The delay time of the shifting operations is minimised separating the process of shifting and processing the shifts in-between a register stage.

DRAWINGS

The invention is explained using the enclosed figures. It shows:

FIG. 1: a schematically view of the invention

FIG. 2: an embodiment of the invention having BR=8 at a time, two clocks after decoding FIG. 3: an embodiment of the invention having BR=4 at a time, four clocks after decoding FIG. 4: an embodiment of the invention having BR=8 at a time, one clock after decoding

DETAILED DESCRIPTION

As shown in FIG. 1, in the invention the operations for shifting are divided in two steps. In the first step a shift using fixed width of bits (BR) is processed, with BR being a common divider of WB and BF if it is possible. Then the equation BF=N×BR is valid. In the second step a shift using variable length is processed. The maximal size of the shift is BR−1.

Using said two operations every code word having the length 1..BF can be separated.

The procedure is illustrated using the following example:

| | |
|---|---|
| Shift to be processed: | 14 bit |
| Bit width: | 4 bit |
| first stage: | 3 × shift 4 |
| second stage: | shift 2 |

The two steps of the shift operation are processed separated each other in dimension and time, as shown in FIG. 1. The first stage (101) is arranged previous the data buffer (102). The data buffer is divided in sub-buffer (103) corresponding to the bit width BR. The second stage (104) is situated at the output of the data buffer.

Starting a decoder process a code word having the length BF is situated at the input of the module for decoding. After the decoding procedure the original length of the code word is known. In the first step of the procedure the sufficient number of data bits being available in the data buffer after processing the shift is checked for decoding a data word of the size BF. Supposed the number being available isn't sufficient a new data word has to be read out of the memory. Simultaneous a N×BR-bit shift is carried out in the first stage for shifting. The number N depends on the length of the decoded code word and on the previous state of the second stage for shifting.

In the case a new data word has to be read, the bits are reaching the proper position in the buffer right away after the shifting process. The shifting process can be taken out parallel or serial. This depends on the number of counts being available (factor 2). The expense of implemented hardware is lower shifting serial.

After reloading the part buffer the lacking variable shift sized 0 to BR−1 is carried out in the second stage of the shifter. Therefore at the input (105) of the second shift stage at least BF+BR bits are always present for ensuring the shift operation. After that the actual bits from the data memory are present at the output for a fresh decoding process.

In FIG. 2 to FIG. 4 embodiments of the invention are illustrated. The value for the width of words WB and the bit window BF each was chosen as 16.

In FIG. 2 an embodiment of the invention having BR=8 at a time two clocks after decoding (factor 2) is shown. Corresponding to BR=8 there are two part buffers with N equal two. The first shifter stage is realised having multiplexer. The second shifter stage (207) is illustrated being a programmable shifter having 16×8 to 1 multiplexer.

In the following a code word to be decoded having the length of 14 bit is supposed for illustration. The second shifter stage (207) is set to shift 4. The lower byte of the code word dw is stored in the part buffer (206). In the part buffer (205) there is stored the upper byte of the code word dw and the multiplexer (202) has to select the lower byte of the code word dw+1.

The lower 4 bit of the part buffer (206) already have been decoded at the previous process of decoding and are not available for decoding any more, if a shift of 4 using the shifter (207) occurs. At the process of decoding further 14 bits of the buffer have been decoded. From this it follows that altogether 18 bit of the 24 bits being available are already decoded. Therefore a code word has to be reloaded for the next process of decoding.

In the first clock the lower byte of dw+1 selected by the multiplexer (202) is loaded into the part buffer (206) using the multiplexer (204). In the second clock the upper byte of dw+1 is selected by the multiplexer (202) and loaded in the part buffer (205) using the multiplexer (203). At the same time a request for loading a new code word is send. At the next clock at the beginning of the new process of decoding the new code word dw+2 is available in the buffer (201). Simultaneous the multiplexer (202) is selecting the lower byte of dw+2 at the clock frequency of the decoding process. The programmable shifter (207) is set to a shift 2. This value results from following calculation:

decoded: 4+14 Bit=18 Bit>16 Bit
→ new code word
1. shifter stage: 2×shift 8
2. shifter stage: shift 2

After the code word being decoded the process begins a new time.

In FIG. 3 an example is shown having a time of 4 clocks after the decoding procedure (factor 2). Here clock by clock the part buffer (307) to (310) are reloaded using the multiplexer (302) to (306). The further process is similar to the embodiment shown in FIG. 2.

In FIG. 4 the circuit is shown having only a time of one clock after the process of decoding. This case has to be threatened especially, because reloading the part buffer isn't possible at every clock. Therefore a part of the shift operations of the first stage only can be processed behind the buffers.

There are cases the lowest byte of the new code word dw+2 has to be loaded into the part buffer (406). As the upper byte of dw+1 being selected by the multiplexer (402) first has to be loaded into the buffer (407) using the multiplexer (404), reloading the buffer (406) at one clock only isn't possible. This case is intercepted using the multiplexer (405) being arranged behind the buffer (406).

We claim:

1. A circuit for reading code words having variable bit lengths out of a memory that stores data words having a fixed data word bit length, the code words being decoded by a decoding module that determines the variable bit length of each of the code words, the circuit comprising:

a combination of buffers and multiplexers that, after a previous one of the code words in a previous window of bits is decoded by the decoding module, performs a first shift of the bits of the data words so as to store therein and provide therewith a new subset of the bits of the data words, the combination of buffers and multiplexers performing the first shift by shifting the bits of a previous subset of the bits of the data words stored and provided thereby and, as needed, storing and shifting the bits of a new one of the data words retrieved from the memory, the previous window of bits having a fixed window bit length, the first shift having a bit length that is equal to a multiple of a fixed bit width and is based on the determined variable bit length of the previous one of the code words; and a shift stage that, following the first shift, performs a second shift of the bits of the data words so as to provide a new window of bits that contain a new one of the code words to be decoded, the shift stage performing the second shift by shifting the new subset of bits, the new window of bits having the fixed window bit length, the second shift having a bit length that is less than the fixed bit width and is based on the determined variable bit length of the previous one of the code words.

2. A circuit as recited in claim 1 wherein the shift stage comprises a programmable shifter.

3. A circuit as recited in claim 1 wherein the combination of multiplexers and buffers does not comprise a barrel shifter.

4. A circuit as recited in claim 1 wherein the data word fixed bit length is a multiple of the fixed bit width.

5. A circuit as recited in claim 4 wherein the previous and new subsets of bits have bit lengths equal to the fixed bit width plus the fixed bit width multiplied by the quotient of the data word fixed bit length divided by the fixed bit width.

6. A method of reading code words having variable bit lengths out of a memory that stores data words having a data word fixed bit length, the code words being decoded by a decoding module that determines the variable bit length of each of the code words, the method comprising the steps of:

with a combination of buffers and multiplexers and after a previous one of the code words in a previous window of bits is decoded by the decoding module, performing a first shift of the bits of the data words so as to store and provide a new subset of the bits of the data words by shifting the bits of a previous subset of the bits of the data words stored and provided thereby and, as needed, storing and shifting the bits of a new one of the data words retrieved from the memory, the previous window of bits having a fixed window bit length, the first shift having a bit length that is equal to a multiple of a fixed bit width and is based on the determined variable bit length of the previous one of the code words; and following the first shift, performing a second shift of the bits of the data words so as to provide a new window of bits that contain a new one of the code words to be decoded by shifting the new subset of bits, the new window of bits having the fixed window bit length, the second shift having a bit length that is less than the fixed bit width and is based on the determined variable bit length of the previous one of the code words.

7. A method as recited in claim 6 wherein the shifting step performed with the combination of multiplexers and buffers is not performed with a barrel shifter.

8. A method as recited in claim 6 wherein the data word fixed bit length is a multiple of the fixed bit width.

9. A method as recited in claim 8 wherein the previous and new subsets of bits have bit lengths equal to the fixed bit width plus the fixed bit width multiplied by the quotient of the data word fixed bit length divided by the fixed bit width.

* * * * *